Z. B. Wakeman,

Railroad Rail,

No. 3,123, Reissued Sept. 15, 1868.

Attest:

W. E. Marrs.
L. L. Coburn

Inventor:

Z. B. Wakeman

United States Patent Office.

ZALMON B. WAKEMAN, OF ROCKFORD, ILLINOIS.

*Letters Patent No.* 78,404, *dated May* 26, 1868; *reissue No.* 3,123, *dated September* 15, 1868.

RAILWAY-RAIL AND SPLICE.

The Schedule referred to in these Letters Patent and making part of the same.

TO ALL WHOM IT MAY CONCERN:

Be it known that I, ZALMON B. WAKEMAN, of Rockford, in the county of Winnebago, and State of Illinois, have invented a new and useful Improvement in Railroad-Rails; and I do hereby declare and make known that the following is a full, clear, and exact description of the same, reference being had to the accompanying drawings, and the letters and figures marked thereon, which form part of this specification.

My said invention does not relate to the material of which the rail is made, nor to the process by which it is manufactured, as said rail may be made of iron or steel, or of both combined, and may be rolled out into the proper and desired form, or cast, as may be preferred.

My invention consists in forming the rail hollow, or in shell-form, in the configuration and shape hereinafter fully set forth; and also in a novel arrangement, in combination with said rails, of an interior block, for the purpose of sustaining and forming the joints or connections uniting the rails together, when laid down to form the track.

To enable those skilled in the art to understand how to construct and use my said improvement, I will proceed to describe the same with particularity, making reference, in so doing, to the aforesaid drawings, in which—

Similar letters of reference in the several figures denote the same parts of my said invention.

Figure 1:
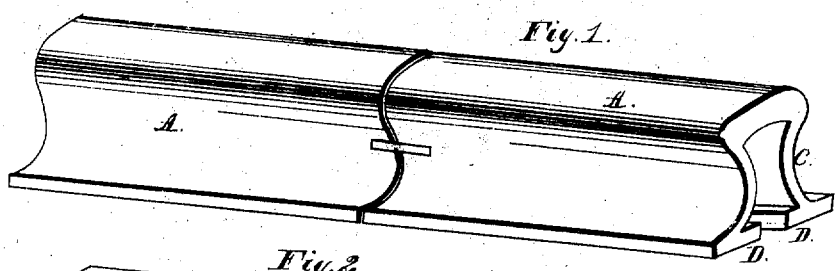
Figure 1 is a perspective view, showing the joint or connection.
Figure 2:
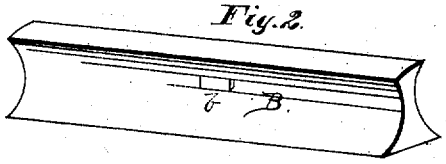
Figure 2 is a perspective view of the connecting-block, to be arranged within the rails.
Figure 5:
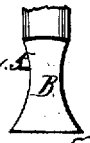
Figure 5 is an end view of the interior connecting-block.
Figure 6:
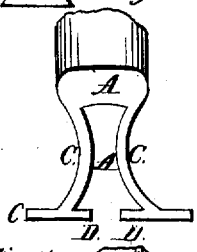
Figure 6 is an end view of my improved rail.

A represents the rail, whose sides, C C, curve inwards and then outwards, as shown, so as to form a base of sufficient width, forming the interior channel or open space A′, narrow at its middle, and flaring out or widening at the top and bottom, as clearly indicated in the drawings.

At the base of the rail, for the purpose of forming a bed for the blocks B, the rail is provided with the flanges D D, which may be of any suitable width to serve the desired purpose, and if the rail were cast, said flanges D D might unite, so as to form a tubular rail, if desired.

Figure 7:
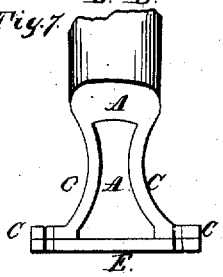
Figure 7 represents an end view of said rail in another form, hereinafter described.
Figure 4:
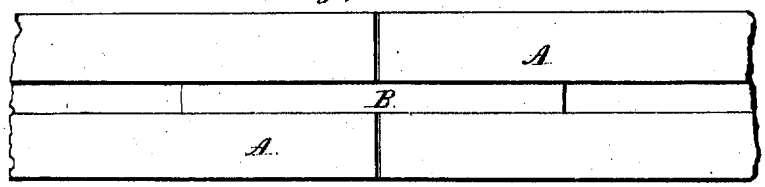
Figure 4 is a bottom view of said invention, at the joint or connection.

It is obvious, however, that the said flanges D D serve no useful purpose, except at the ends of the rails, where the block B rests, and therefore said flanges may be dispensed with, except at the ends of the rail. Or, if preferred, said flanges may be wholly dispensed with, the rail being formed, as shown in fig. 7, without said flanges D D, in which case a plate, E, can be bolted or riveted beneath the rails at each end, as also shown in said fig. 7, said plate being about one-half the length of the blocks B, so as to form a firm and secure bearing for said blocks, as desired. Instead of securing said plates E by means of bolts or rivets, the edges thereof may be formed up over the edges of the rail, so as to be secured in such manner, or any other suitable and convenient mode of securing said plates to the rail may be adopted. In such plate, secured as aforesaid, an equivalent is found for the aforesaid flanges D D.

The block B is intended to be about twenty inches long, although said length may be varied as desired, and the dimensions and configuration thereof should exactly coincide with the dimensions and shape of the hollow, A′, within the shell rail, so that when said block is inserted into the ends of the rails, it shall fit accurately therein, and form a firm, true, even support for the contiguous rails, so that there shall be vertical or lateral movement or play of one of the rails with respect to the other.

Upon each side of said blocks B, at the middle thereof, a projection, *b b*, is formed, which may be done by driving a suitable piece of metal transversely through said block, in an opening made in the block for that purpose, in which case the block *b* may be made wedge-shaped, so as to be firmly fixed in place by the driving in thereof.

At each side of the ends of the rails, corresponding in position with the projections *b b*, and of a depth equal to one-half the width of said projections, slots *a a* are made, so that when the block B is placed in the end of one rail, it may be forced back into the rail until the projection *b* enters the slot *a*, which prevents the further entrance of the block.

Figure 3:
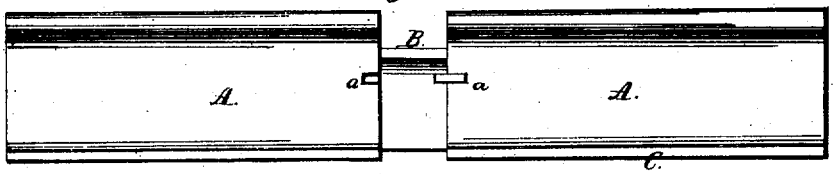
Figure 3 is a side view of two rails and said block, illustrating the manner of laying the track.

The next rail is then adjusted upon the opposite end of the block, as seen in fig. 3, and forced up until the slot *a* passes upon the projection *b*, at which point the ends of the rails meet, as clearly shown in fig. 1

The employment of the projections *b b* upon the blocks B, insures the lying of the blocks equally in each rail, which, without them, or some equivalent stop in the hollow rail, would rarely occur.

The notches or slots *a a* in the ends of the rails, provide for said stops *b b*, and permit the ends of contiguous rails to come together.

By this method of forming the joints or connections between the rails, the use of screws or bolts in making the connections is entirely dispensed with.

By making the rails hollow, the expansion and contraction thereof, by reason of varying temperature, is much less than in case of solid rails, and hence, in laying the track, the rails can be placed much closer together than solid rails, and the arrangement of the coupling-block in the rail permits said rails, in contracting or expanding, to slide or move freely upon the blocks.

When it is desired to take up the track, or any of the rails, the key *b* is driven out of the block B, and a hook or suitable tool is passed beneath the rail, entering the hollow therein at the rear of the block, which can then be moved wholly within one of the rails, when the rail can readily be taken up, as desired.

If the bottom of the rail were cast or formed solid, a suitable slot or opening could be formed at the end of the block, to permit the introduction of the tool to remove said block, as above mentioned.

I am aware that a hollow rail has been made heretofore, in the form of a U inverted, having the shell sides vertical; but by curving the sides of the shell inwards at the centre, to give the rail the T-form, it is made much stronger, and more durable, and is adapted to the form or mode of connection herein shown and described, inasmuch as the curved form of the sides, projecting inward, permits the block B to be inserted longitudinally in the opening, A′, while at the same time all downward displacement of said block is prevented, which function the inverted U-rails aforesaid cannot perform.

Having described the nature, construction, and operation of my invention, I will proceed to specify what I claim, and desire to secure by Letters Patent.

1. I claim the hollow-shell rail, A, when the sides are curved in towards each other, so as to receive and retain the block B, as and for the purposes set forth.

2. I claim the combination of the hollow rails A with the connecting-block B, provided with a removable bar or key, *b*, substantially as herein set forth and shown.

Z. B. WAKEMAN.

Witnesses:
W. E. MARRS,
W. BRUNS.